Sept. 17, 1935.  R. R. OSBORN  2,014,776
WING CONSTRUCTION
Filed Feb. 1, 1933    2 Sheets-Sheet 1
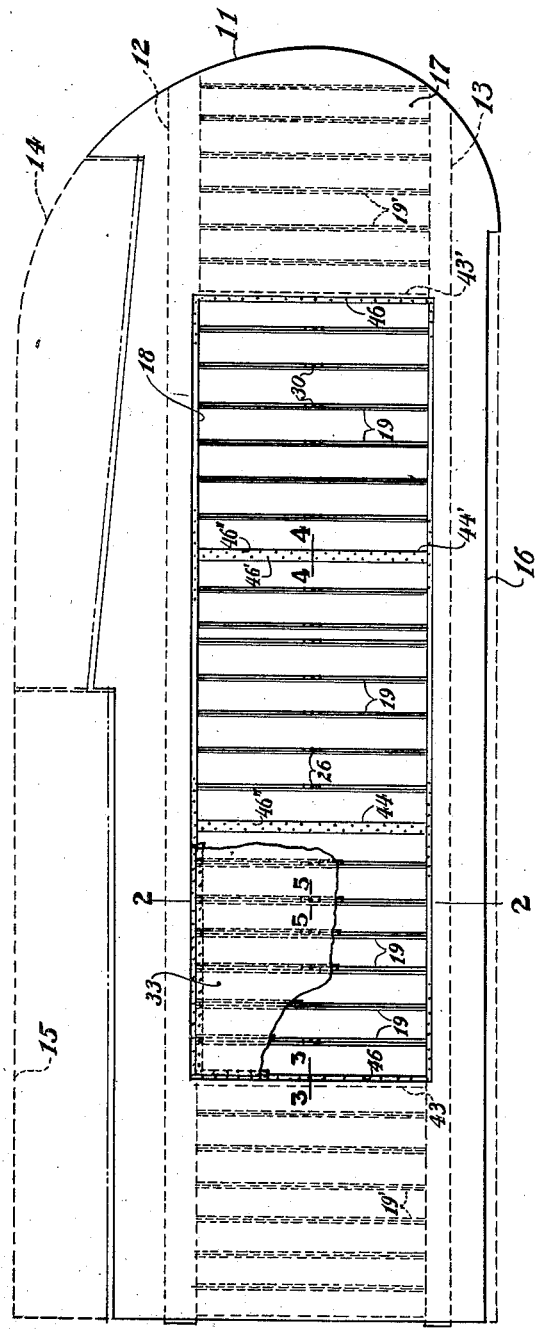
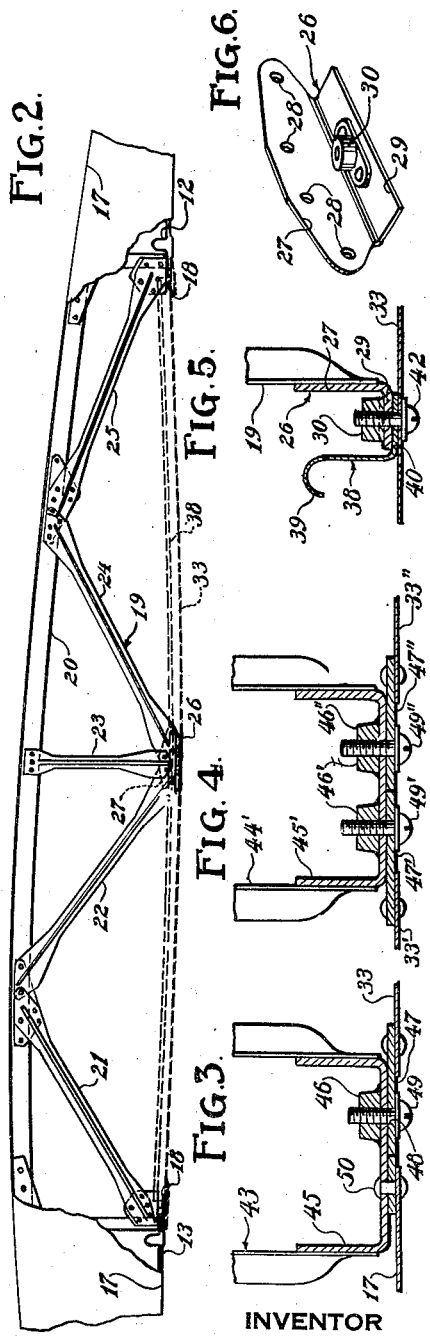
INVENTOR
ROBERT R. OSBORN.
BY HIS ATTORNEY Sept. 17, 1935.    R. R. OSBORN    2,014,776
WING CONSTRUCTION
Filed Feb. 1, 1933    2 Sheets-Sheet 2
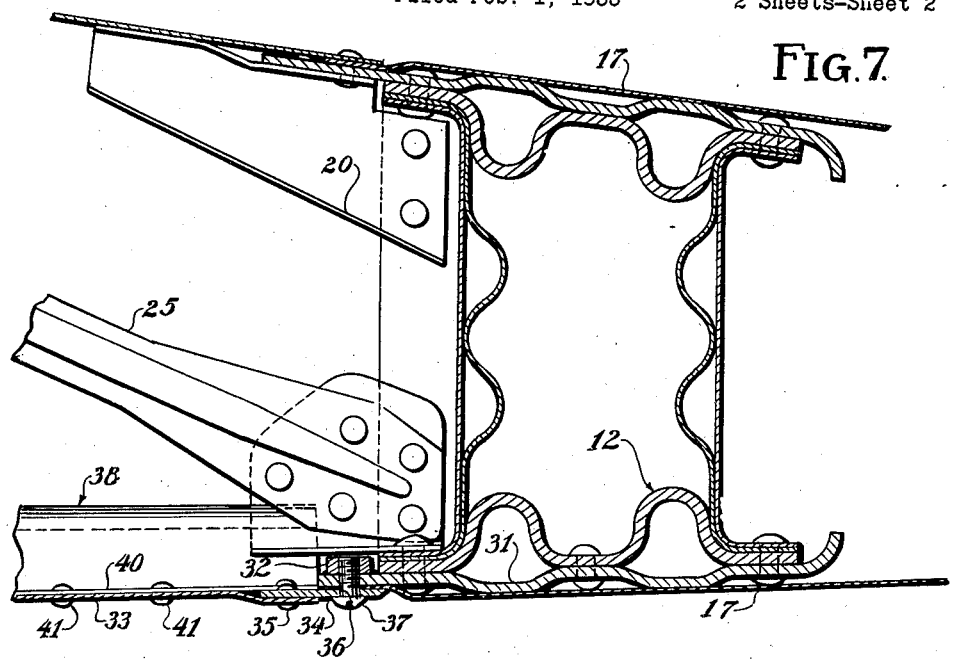
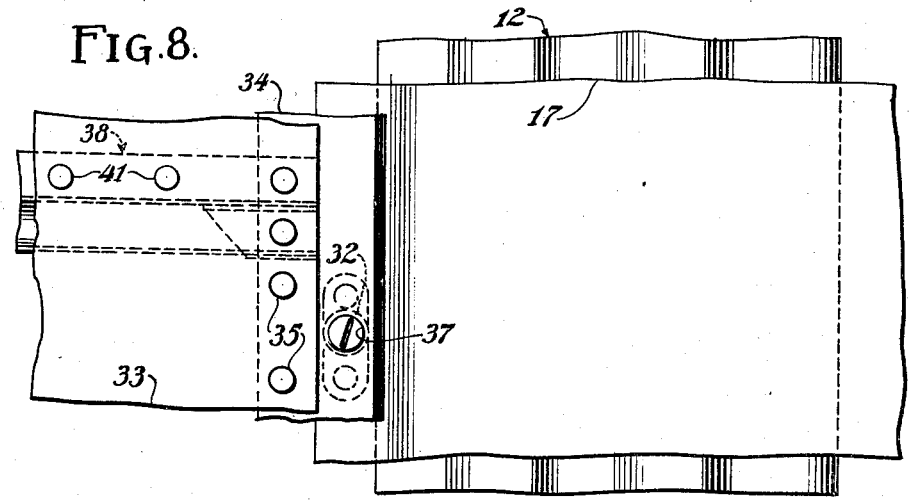
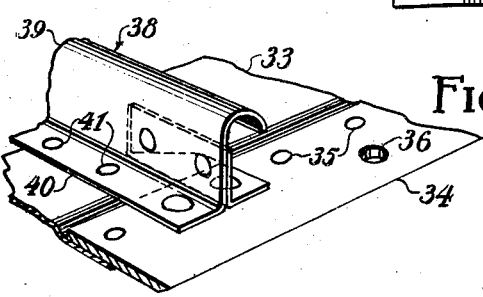
INVENTOR
ROBERT R. OSBORN.
BY HIS ATTORNEY Patented Sept. 17, 1935

2,014,776

UNITED STATES PATENT OFFICE 2,014,776

WING CONSTRUCTION

Robert R. Osborn, Kenmore, N. Y., assignor to Curtiss Aeroplane & Motor Company, Inc., a corporation of New York Application February 1, 1933, Serial No. 654,641

1 Claim. (Cl. 244—31)

This invention relates to aircraft, and more particularly to access openings in the wings thereof.

An object of the invention is to provide a structure for a large access opening in the wing of an aircraft.

Another object is to provide a partial truss structure for the wing of an aircraft and a cover for an access opening, which is adapted to complete the partial truss structure.

A further object is to provide a metallic access opening cover which carries structural members adapted to form part of the wing structure.

A further object is to provide an unusually large access opening in a wing to allow greater accessibility to the interior parts thereof than has heretofore been possible.

Another object is to provide an access opening in a wing large enough to allow of the installation, removal, and servicing of control mechanism located within the wing.

A still further object is to provide a novel wing structure and means for removably fastening part of said structure to the balance of said structure.

Further objects will be apparent from a reading of the subjoined specification and claim, and from a consideration of the accompanying drawings.

Recently it has been found desirable to provide a metallic or ply wood covering for the surfaces of aircraft wings, due largely to the increases in speed which have evolved in aircraft design, which require a more rigid covering material to withstand flight stresses. The older practice of fabric covering is adequate for aircraft of moderate speeds, but greater serviceability and strength result from the more solid coverings. In wings, as has been the practice in the past, it is customary to install control members for the operation of ailerons, flaps, auxiliary airfoils and the like. It is, of course, necessary to provide for inspection of such control mechanism and to provide for the inspection of the internal structure of the wing, such as struts, ribs and the like, so that safe flight conditions may at all times be maintained.

In the past, small inspection openings have frequently been provided so that access may be obtained to movable joints and members within the wing, but such openings are usually inadequate for the bodily removal of such mechanism.

My invention provides an access opening covering a substantial portion of the wing surface, and provides a cover for such an opening which will form part of the airfoil surface. In order to conserve weight and to make the cover more rigid and stronger, I provide ribs or stiffening members on the inner side of the access cover which are adapted to cooperate with and to form a part of the structure of the airfoil itself. In the embodiment shown, I provide a large access opening in the under side of the conventional wing which has the usual spars and truss ribs. A portion of the lower chord member of those ribs included in the area bounded by the access opening, is attached rigidly to the access covering, and when the cover is installed, these stiffeners cooperate with the rib trusses to form part of the lower chord members thereof.

It is to be noted that the covering of the wing, in itself, and also the access cover, are arranged to assume certain stresses such as, but not limited to, drag and anti-drag stresses. It is well known that the covering skins of airfoils have been used for assuming drag and anti-drag stresses, but it is believed novel to combine an access cover which, with the balance of the wing covering, will assume these stresses. In the past, it has been the custom to reinforce the edges of the covering skin opening, to assume the loads which would otherwise be assumed by the skin confined in the area bounded by the opening, thus leaving the access cover itself, unstressed.

For a clearer understanding of my invention, reference may be made to the drawings, in which:

Fig. 1 is a bottom view of an aircraft wing constructed in accordance with my invention, with a fragmentary portion of the access cover attached thereto;

Fig. 2 is a partial section on the line 2—2 of Fig. 1;

Fig. 3 is a partial section on the line 3—3 of Fig. 1;

Fig. 4 is a partial section on the line 4—4 of Fig. 1;

Fig. 5 is a partial section on the line 5—5 of Fig. 1;

Fig. 6 is a perspective view of one of the fittings shown also in Fig. 2;

Fig. 7 is an enlarged section of the rearward portion of the wing in Fig. 1;

Fig. 8 is a bottom view of a portion of the wing; and

Fig. 9 is a perspective view of a portion of the access cover shown also in Figs. 7 and 8.

Referring to Fig. 1, a wing 11 is provided with a rear spar 12 and a front spar 13 extending along the span of the wing. Rearward of the spar 12 may be provided an aileron 14 and a trailing edge flap 15. Forward of the spar 13, at the leading edge of the wing, may be provided a cutout 16 suitable for use in conjunction with an auxiliary airfoil, whereby a leading edge slot may be formed. The wing 11 is provided with a covering 17, and in the covering 17, between the spars 12 and 13, an opening 18 is formed.

A plurality of ribs 19 and 19' are adapted to bridge the gap between the front spar 13 and the rear spar 12, such ribs serving to distribute air loads imposed on the covering 17 to the spars 12 and 13. The ribs 19' are conventional, and lie outside of the area enclosed by the access opening 18.

The ribs 19 which bridge the spars in the neighborhood of the access opening 18, comprise an upper chord member 20 extending from the upper surface of the spar 13 to the upper surface of the spar 12. Truss members 21, 22, 23, 24 and 25 are attached to the chord member 20 and serve, as will be later described, to form part of the complete rib 19. In the embodiment shown, the truss member 21 extends diagonally from the lower surface of the spar 13 to the chord member 20. The truss members 22, 23 and 24 are attached to the chord member 20 at their upper ends, and are attached to each other by means of a fitting 26 at their lower ends. The truss member 25 extends diagonally from the upper chord member 20 to the lower surface of the rear spar 12. The fitting 26, shown in perspective in Fig. 6, comprises a gusset portion 27 provided with holes 28 to which the truss members 22, 23 and 24 may be attached as by riveting, and a flange portion 29 bent at substantially a right angle to the gusset portion 27. The flange 29 is provided with a threaded bushing 30 to which the access covering later to be described, may be attached.

Referring now to Fig. 7, the lower surface of each spar 12 is provided with a flange 31 which not only serves as a reinforcing chord member for the spar 12 but, by being provided with a threaded bushing 32 at its forward edge, serves to provide holding means for an access cover 33. The lower rearward edge of the forward spar 13 is provided with a flange identical in its character with the flange 31. Such a flange on the lower surface of the spar 13 is also provided with a threaded bushing similar to 32.

The access cover 33 comprises a substantially flat plate of metal or other suitable material adapted to completely cover the access opening 18. At its edges, as shown in Figs. 7, 8 and 9, it is provided with a reinforcing strip 34 riveted thereto as by rivets 35. The strip 34 is provided with a plurality of openings 36 spaced to register with the threaded openings in the bushings 32 which are attached, as previously indicated, along the inner edges of the flange 31, and of a similar flange on the spar 13.

Screws 37 are adapted to be inserted through the openings 36 and to engage in the threaded opening of the bushings 32 to firmly hold the strip 34 and the cover 33 in place.

By its continuous surface, and by its attachment to the balance of the wing, the cover 33 is adapted to assume any air and drag or anti-drag loads which may be imposed thereon. Drag or anti-drag stresses assumed by the covering 17, may be transmitted directly through the cover 33, the usual bulky frame for an access cover being thus eliminated, saving weight and complexity. The attachment of the cover 33 to the covering 17, gives, in effect, a continuous envelope for the wing. By the use of flat metal sheet in the covering 17 and the cover 33, all drag and anti-drag stresses may be assumed therein, eliminating the usual interior diagonal wire or strut drag and anti-drag bracing necessary in wings covered with fabric or corrugated material.

The cover 33 has attached thereto a plurality of braces 38, shown most clearly in Fig. 9. The braces 38 may be formed as angle members having an overturned upstanding edge 39 and a flange 40 lying adjacent to the cover 33 and fastened thereto as by rivets 41. Each brace 38, when the cover 33 is attached over the access opening 18, is adapted to lie in substantially the same plane as one of the ribs 19, and to form the lower chord member of such rib. By the attachment of the brace 38 to the strip 34, and of the attachment of the strip 34 to the flange 31, a rigid joint is effected whereby the truss stresses may be properly distributed among the rib members 20, 21, 22, 23, 24, 25 and the brace 38. To further complete the rib truss structure, the mid portion of the brace 38, between the spars 12 and 13 is adapted to be attached to the fittings 26 of each rib. An opening is formed through the cover 33 and the brace 38 to register with the threaded bushing 30 carried by the fitting 26, and a screw 42 may then be inserted from the outside of the wing and screwed into the bushing 30, thus holding the cover 33 and the brace 38 firmly to the mid-portion of the rib truss structure. By the attachment of the brace 38 to the spars 12 and 13 and to the fitting 26, said brace forms a removable lower chord member to complete the rib truss.

The access opening 18 spans a plurality of ribs 19, and each rib is similarly provided with fittings 26 adapted to receive screws 42 through the registering portions of the cover 33 and the braces 38.

In the normal wing, a plurality of compression members, such as 43 and 44, are spaced laterally between the wing spars. In the embodiment shown, compression ribs 43 form the lateral edges of the access opening 18, to which the lateral edges of the cover 33 are attached. Attaching means are provided as shown in Fig. 3. A lower channel-shaped chord member 45 for the compression rib 43, is provided on its inner face with a plurality of spaced threaded bushings 46. The lateral edge of the cover 33 has attached thereto a reinforcing strip 47, having openings 48 for registry with the openings in the threaded bushings 46. Screws 49 may then be inserted through the openings 48 to engage the bushings 46 to hold the lateral edges of the cover 33 firmly to the wing. It may be noted that the permanent covering 17 is also attached to the compression ribs 43, as by rivets 50, so that the covering 17 and the access cover 33, when assembled, lie flush and present a smooth surface for air flow thereover.

In a large access cover, such as that shown, it may be considered desirable to make it in several sections, to make handling, attachment and removal an easier service operation. This is accomplished by providing a sectional cover adapted to extend transversely from one compression rib, such as 43, to the next compression rib 44, another sectional cover such as 33' extending from the compression rib 44 to the compression rib 44', and still another sectional cover, such as 33'', extending from the compression rib 44' to the compression rib 43'. Attachment of the sectional covers 33' and 33'' is effected in a manner similar to that provided for the extreme lateral edges of the cover 33, described above. For instance, the intermediate compression ribs such as 44 and 44' are provided with a plurality of threaded bushings 46', arranged in a line along the inner surface of the rib chord member 45' (shown in Fig. 4). Into these bushings, screws 49' are driven from the outside to hold the border strip 47' forming part of the cover section 33'. Similarly, the cover section 33" is provided with a border strip 47", which is held adjacent the rib chord member 45' by screws 49" driven into a plurality of threaded bushings 46", arranged in a line parallel to the line of the bushings 46'.

It is to be understood that the compression ribs 43, 44, 44' and 43' are complete trusses, having their lower chord members 45 and 45' rigidly attached as part of their structure. Thus, such compression ribs differ from the ordinary ribs 19, which lie between the compression ribs, and which themselves are an incomplete structure adapted to be completed by the attachment of the cover 33, or the covers 33, 33' and 33".

While I have described my invention in detail, in its present preferred embodiment, it will be obvious to those skilled in the art, after understanding my invention, that various changes and modifications may be made therein without departing from the spirit or scope thereof. I aim in the appended claim to cover all such modifications and changes.

What is claimed is:

In an aircraft wing comprising forward and rearward spars joined by spaced compression members, a plurality of ribs parallel to and more narrowly spaced than said members, also joining said spars, said ribs comprising trussed chord and bracing elements, one said chord element of each rib being separate from the balance of said rib, a metallic sheet fixed to the several said detachable rib chord elements, said sheet being bounded at its forward and rearward edges by said forward and rearward spars respectively, and being bounded at each lateral edge thereof by one said compression member, and means for removably attaching the several sheet edges at frequently spaced intervals to the forward and rearward spars and compression members, said sheet, when attached, holding said detachable rib chord elements in the proper cooperative relationship with the respective ribs.

ROBERT R. OSBORN.